(12) United States Patent
Makajima et al.

(10) Patent No.: US 6,782,860 B2
(45) Date of Patent: Aug. 31, 2004

(54) ENGINE STARTING CONTROL APPARATUS

(75) Inventors: Hiroyuki Makajima, Saitama (JP); Takeshi Yanagisawa, Saitama (JP); Taiichi Imaike, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/309,165

(22) Filed: Dec. 4, 2002

(65) Prior Publication Data

US 2003/0140881 A1 Jul. 31, 2003

(30) Foreign Application Priority Data

Dec. 5, 2001 (JP) .................................. 2001-371372

(51) Int. Cl.[7] .............................................. F02N 11/08
(52) U.S. Cl. .................................. 123/179.3; 123/179.5
(58) Field of Search ........................... 123/179.3, 179.4, 123/179.5

(56) References Cited

U.S. PATENT DOCUMENTS

| | | | | |
|---|---|---|---|---|
| 4,364,344 A | * | 12/1982 | Buetemeister ............ | 123/179.5 |
| 5,022,363 A | * | 6/1991 | Staerzl .................... | 123/179.5 |
| 5,458,098 A | * | 10/1995 | Yagi et al. ................ | 123/179.3 |
| 5,713,320 A | * | 2/1998 | Pfaff et al. ............... | 123/179.3 |

FOREIGN PATENT DOCUMENTS

| | | |
|---|---|---|
| JP | 63-75323 A | 4/1988 |
| JP | 06-064451 A | 3/1994 |
| JP | 07-071350 A | 3/1995 |

\* cited by examiner

Primary Examiner—Andrew M. Dolinar
(74) Attorney, Agent, or Firm—Birch, Stewart, Kolasch & Birch, LLP

(57) ABSTRACT

An engine starting control apparatus that causes a crankshaft of an engine to rotate reversely to a predetermined position immediately after the engine is stopped to make preparations for next starting of the engine. This action is performed in order to prevent firing by useless ignition upon forward rotation of the crankshaft when the engine is started again. When the engine restarted, the engine starting control apparatus causes the engine to rotate forwardly from the predetermined position. The apparatus includes a starter motor connected to the crankshaft, a reverse rotation means capable of rotating the engine reversely to a predetermined position, an ignition device for igniting the engine in the proximity of the top dead center of a piston, and an ignition suppression device for inhibiting the ignition of the engine for a predetermined period of time after the forward rotation of the engine.

16 Claims, 14 Drawing Sheets

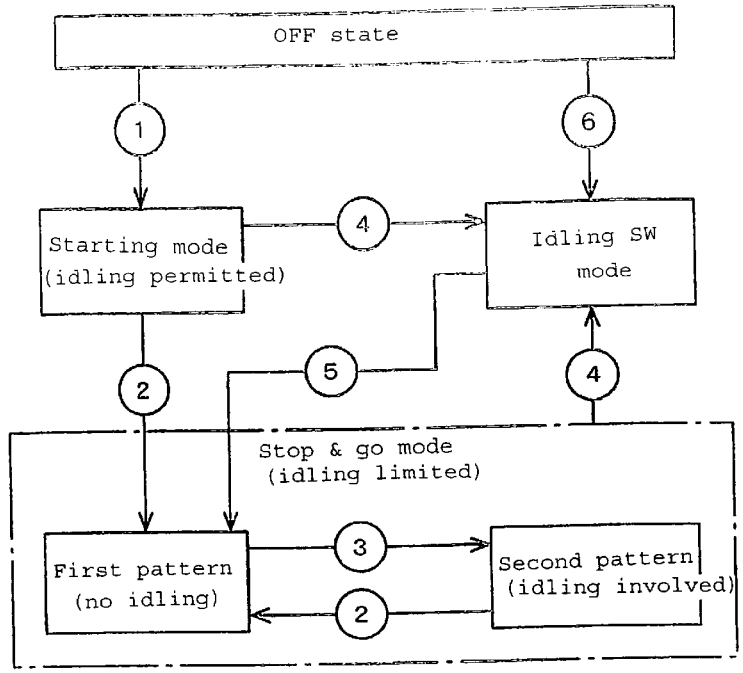

Condition [1] Main SW → switched from OFF to ON
            AND
            idling SW → OFF Condition [2] Vehicle speed equal to or higher than predetermined vehicle speed continues for predetermined period of time or more.

Condition [3] Ignition OFF state continues for three minutes or more

Condition [4] Idling SW → switched from OFF to ON

Condition [5] Idling SW → switched from ON to OFF

Condition [6] Idling SW → ON
            AND
            main SW → switched from OFF to ON

FIG. 5

| | Starting mode | Idling SW mode | Stop & go mode - First pattern | Stop & go mode - Second pattern |
|---|---|---|---|---|
| Engine starting control | Starter SW → ON<br>Stop SW → ON<br>Ne → idling speed or lower<br>Engine starting instruction → ON | same as left | Throttle SW → ON<br>Seat SW → ON<br>Ne → idling speed or lower | Starter SW → ON<br>Stop SW → ON<br>Ne → idling speed or lower<br>Throttle SW → ON<br>Seat SW → ON<br>Ne → idling speed or lower |
| Standby indicator control | Always OFF | Always OFF | Seat SW → ON<br>Ne → preset speed or lower | Always OFF |
| Ignition control | Always ON | Always ON | Throttle SW → ON<br>Vehicle speed → higher than 0 Km | Always ON |
| Headlamp control | Ne → present speed or higher (lower than idling speed) ON<br>Vehicle speed → higher than 0 km | Always ON | Always ON | Always ON |
| Warning buzzer control | Always OFF | Turned ON when ignition is in OFF state and non-seated state continues for one second or more | Ignition OFF and seat SW OFF states continued for one second or more<br>Ignition OFF state continued for three minutes or more | Ignition OFF<br>Throttle SW → OFF ON<br>Vehicle speed → 0 km |
| Charging control | <Starting conditions><br>Vehicle speed → 0 km<br>Ne → preset speed or lower<br>Throttle SW → ON  Start<br>Transition from fully closed to fully open state of throttle → 0.3 second or less | <Ending conditions><br>Time elapsed after starting → six seconds  End<br>Ne → preset speed or higher<br>Throttle opening → decreased | | <Control contents><br>Charging voltage → changed from 14.5 V to 12.0 V |

FIG. 6

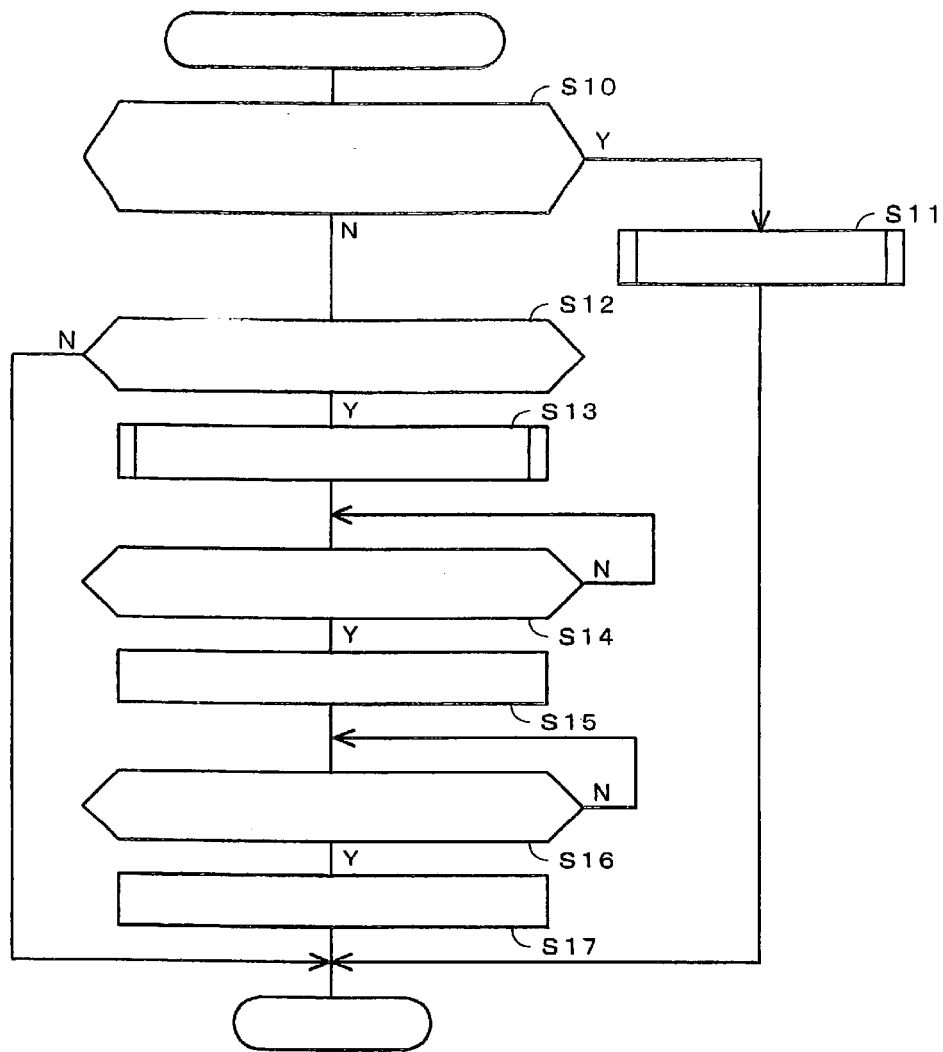

```
Top   ... Engine starting control
S10   ... Engine starting instruction detected in
          "starting mode" or "idling SW mode"?
S11   ... Starting reverse rotation control
S12   ... Engine stop detected in "stop & go mode"?
S13   ... Stopping reverse rotation control
S14   ... Engine starting instruction detected?
S15   ... Start forward rotation energization
S16   ... Engine starting completed?
S17   ... Stop forward rotation energization
Bottom ... End
```

FIG. 10

Top ... Stopping reverse rotation control
Right to S1301 ... Any other
Right to S1302 ... Any other
S1303 ... Drive with duty ratio of 70%
S1304 ... Drive with duty ratio of 80%
S1305 ... Drive with duty ratio of 70%
S1306 ... Start reverse rotation energization
S1307 ... Measure pass time $\Delta tn$ of stage
S1308 ... Passed the stage #0?
S1309 ... Stage #32?
S1311 ... End reverse rotation energization
Bottom ... End

ENGINE STARTING CONTROL APPARATUS

CROSS-REFERENCE TO RELATED APPLICATION

The present application claims priority under 35 U.S.C. §119 to Japanese Patent Application No. 2001-371372 filed on Dec. 5, 2001, the entire contents of which are hereby incorporated by reference.

BACKGROUND OF THE INVENTION

1. Field of the Invention

This invention relates to an engine starting control apparatus that cranks an engine by means of a starter motor to start the engine, and more particularly to an engine starting control apparatus that cranks, upon starting of an engine, a crankshaft in the reverse direction to a predetermined position to improve the startability of the engine.

2. Description of Background Art

The official gazette of Japanese Patent Laid-open No. Sho 63-75323 discloses an engine stopping and starting control apparatus which controls an engine so that the engine is automatically stopped when a vehicle stops and re-started. Starting control is accomplished when a throttle grip is operated in the stopping state of the vehicle to issue an instruction to start the vehicle, and has the effect of reducing the production of exhaust gas or consumption of the fuel, particularly during idling. As a result, this device provides some environmental and energy saving benefits.

Another device is disclosed, for example, in the official gazette of Japanese Patent Laid-open No. Hei 6-64451, or the official gazette of Japanese Patent Laid-open No. Hei 71350. This device uses a technique of rotating a crankshaft reversely to a predetermined position before an engine is started, and then starting the engine from the reversely rotated position. As such, this device helps to reduce the cranking torque upon starting of the engine, thus enhancing the startability of the engine.

However, the above devices are not without problems.

In a four-cycle engine, it is sufficient if ignition is performed at the compression top dead center, and ignition is not necessary at the exhaust top dead center. However, for the reason that it is necessary to discriminate a stroke in order to cause ignition to occur only at the compression top dead center and that there is no actual loss even if ignition occurs at the exhaust top dead center, ignition is usually performed as useless ignition at the exhaust top dead center.

However, if the reverse rotation control described above is applied, since fuel air mixture remaining in the exhaust pipe is sucked into the cylinder in the exhaust stroke upon the reverse rotation, there is the possibility that the air fuel mixture may be fired by useless ignition at the exhaust top dead center upon subsequent forward rotation.

SUMMARY AND OBJECTS OF THE INVENTION

It is an object of the present invention to solve the problems of the prior art described above by providing an engine starting control apparatus which is capable of preventing firing by useless ignition with a simple and inexpensive configuration that does not need a system for discrimination of a stroke, or the like.

In order to attain the object described above, the present invention adopts the following countermeasures for an engine starting control apparatus; namely, upon starting of an engine, a crankshaft is caused to rotate reversely to a predetermined position, and then rotate forwardly.

Several characteristics of the present invention are described below:

(1) The engine starting control apparatus of the present invention includes a starter motor connected to the crankshaft, ignition means for igniting the engine in the proximity of the top dead center of a piston, and ignition suppression means for inhibiting the ignition of the engine for a predetermined period of time after the forward rotation of the engine.

(2) In the engine starting control apparatus of the present invention the reverse rotation control means causes the crankshaft to rotate reversely until the piston runs over the exhaust top dead center.

(3) In the engine starting control apparatus of the present invention the engine has a valve overlap period within which an intake valve and an exhaust valve communicate with each other in the proximity of the exhaust top dead center, and the ignition means inhibits ignition and causes the engine to misfire at a position in the proximity of the exhaust top dead center.

(4) In the engine starting control apparatus of the present invention the ignition suppression means inhibits ignition of the engine only for the first ignition timing after the engine is rotated forwardly.

(5) Further, the engine starting control apparatus of the present invention includes a kick starting means for causing the crankshaft to rotate forwardly using man-power, and an ignition suppression cancellation means for canceling the inhibition of the ignition of the engine by the ignition suppression means when the engine is started by man-power.

With the characteristic (1) described above, even if air fuel mixture remaining in the exhaust pipe is sucked into the cylinder in an exhaust stroke during the reverse rotation and is compressed at the exhaust top dead center during the forward rotation thereafter, since ignition is inhibited at the timing, firing of the air fuel mixture is prevented. Accordingly, firing by useless ignition is prevented by using a simple and inexpensive ignition means. Moreover, the apparatus has high flexibility and avoids the need to perform a stroke discrimination operation.

With the characteristic (2) described above, since the crankshaft always is rotated forwardly and reversely on reaching the boundary of the exhaust top dead center, the running start distance upon forward rotation can be assured sufficiently. Accordingly, firing by useless ignition can be prevented while maintaining good startability.

With the characteristic (3) described above, firing by useless ignition can also be prevented in a structure wherein, when the crankshaft stops in the proximity of the exhaust top dead center, the intake system, the combustion chamber and the exhaust system communicate with each other, which makes it likely that the combustible air fuel mixture flows into the exhaust system, as with a high output power engine having a valve overlap period.

With the characteristic (4) described above, since ignition is inhibited only with regard to the first useless ignition, rapid firing by normal ignition can be achieved. Accordingly, firing by useless ignition can be prevented without sacrificing the startability.

With the characteristic (5) described above, since misfiring is not inhibited upon cranking from a state wherein the crankshaft is not rotated reversely as upon kick starting, the startability upon kick starting is not disturbed by unnecessary inhibition of ignition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view illustrating transition conditions of an operation mode and an operation pattern in stop & go control;

FIG. 6 is a view illustrating principal operations in the stop & go control as a table;

FIG. 10 is a flow chart of the engine starting control;

DETAILED DESCRIPTION OF THE PREFERRED EMBODIMENTS

Figure 1:
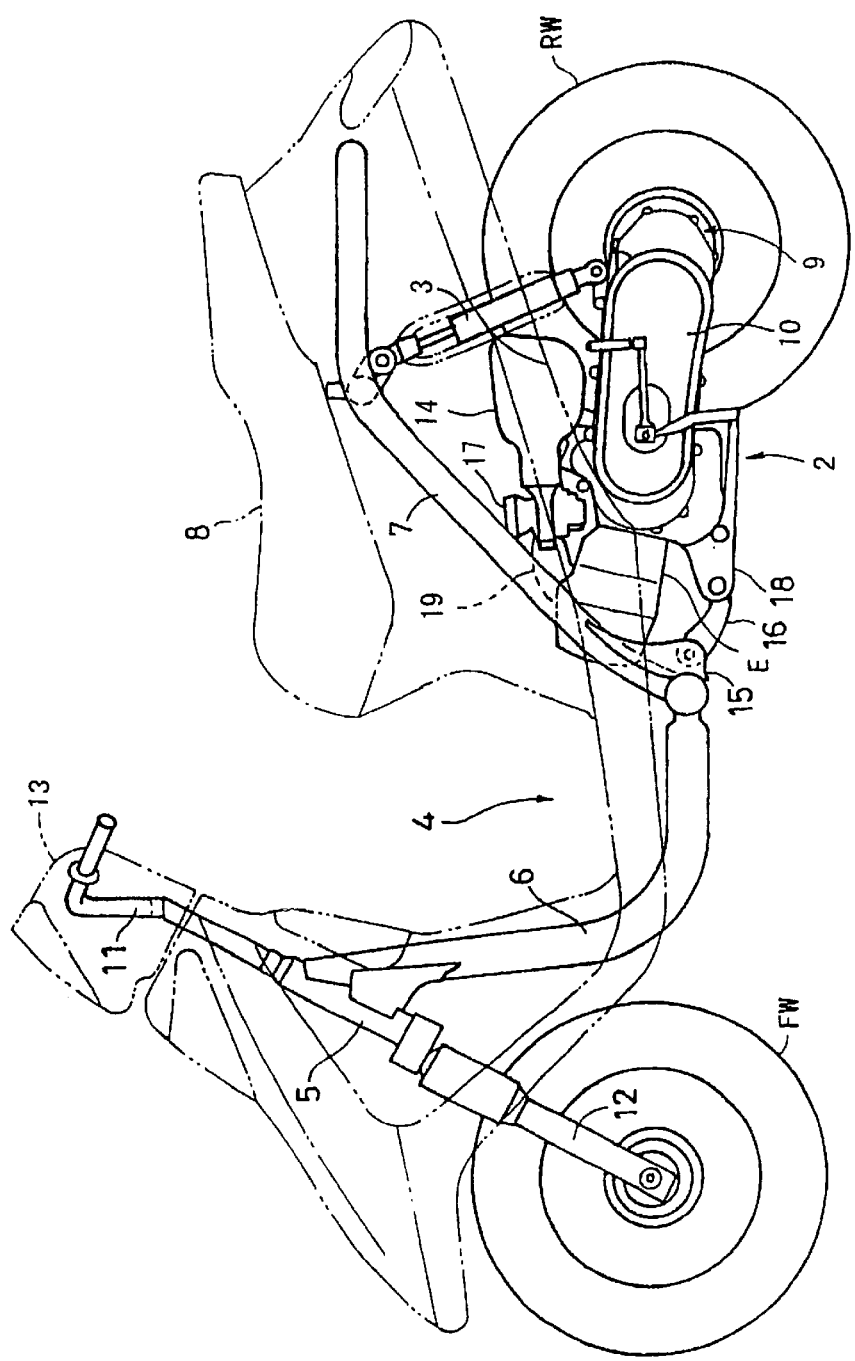
FIG. 1 is a general side elevational view of a scooter type motorcycle to which the present invention is applied.

In the following, a preferred embodiment of the present invention is described in detail with reference to the drawings. FIG. 1 is a general side elevational view of a scooter type motorcycle to which an engine starting control apparatus of the present invention is applied. The vehicle further has an engine automatic stopping and starting function of automatically stopping an engine if the vehicle is stopped but driving, such that when a throttle grip is opened or a starter switch is operated into an on-state is performed thereafter, a starter motor automatically to re-start the engine.

A vehicle body front part and a vehicle body rear part are connected to each other by a low floor member 4, and a vehicle body frame which forms a skeleton of the vehicle body is generally formed from a down tube 6 and a main pipe 7. A fuel tank and an accommodation box (both not shown) are supported by the main pipe 7, and a seat 8 is disposed above the fuel tank and the accommodation box.

On the vehicle body front part, a handle bar 11 is provided for pivotal motion by and above a steering head 5, and a front fork 12 extends downwardly and a front wheel FW is supported for rotation at a lower end of the front fork 12. A handle bar cover 13 serving also as an instrument panel covers the handle bar 11 from above. A bracket 15 is provided in a projecting manner at a lower end of a rising portion of the main pipe 7, and a hanger bracket 18 of a swing unit 2 is connected to and supported by the bracket 15 for rocking motion through a link member 16.

A single-cylinder four-cycle engine E is carried at a front portion of the swing unit 2. A belt type non-stage transmission 10 extends rearwardly from the engine E, and a rear wheel RW is supported for rotation on a reduction gear mechanism 9, which is provided at a rear portion of the belt type non-stage transmission 10 with a centrifugal clutch interposed therebetween. A rear cushion 3 is interposed between an upper end of the reduction gear mechanism 9 and an upper bent portion of the main pipe 7. A carburetor 17 connected to an intake pipe 19 extending from the engine E and an air cleaner 14 connected to the carburetor 17 are disposed at a front portion of the swing unit 2.

Figure 2:
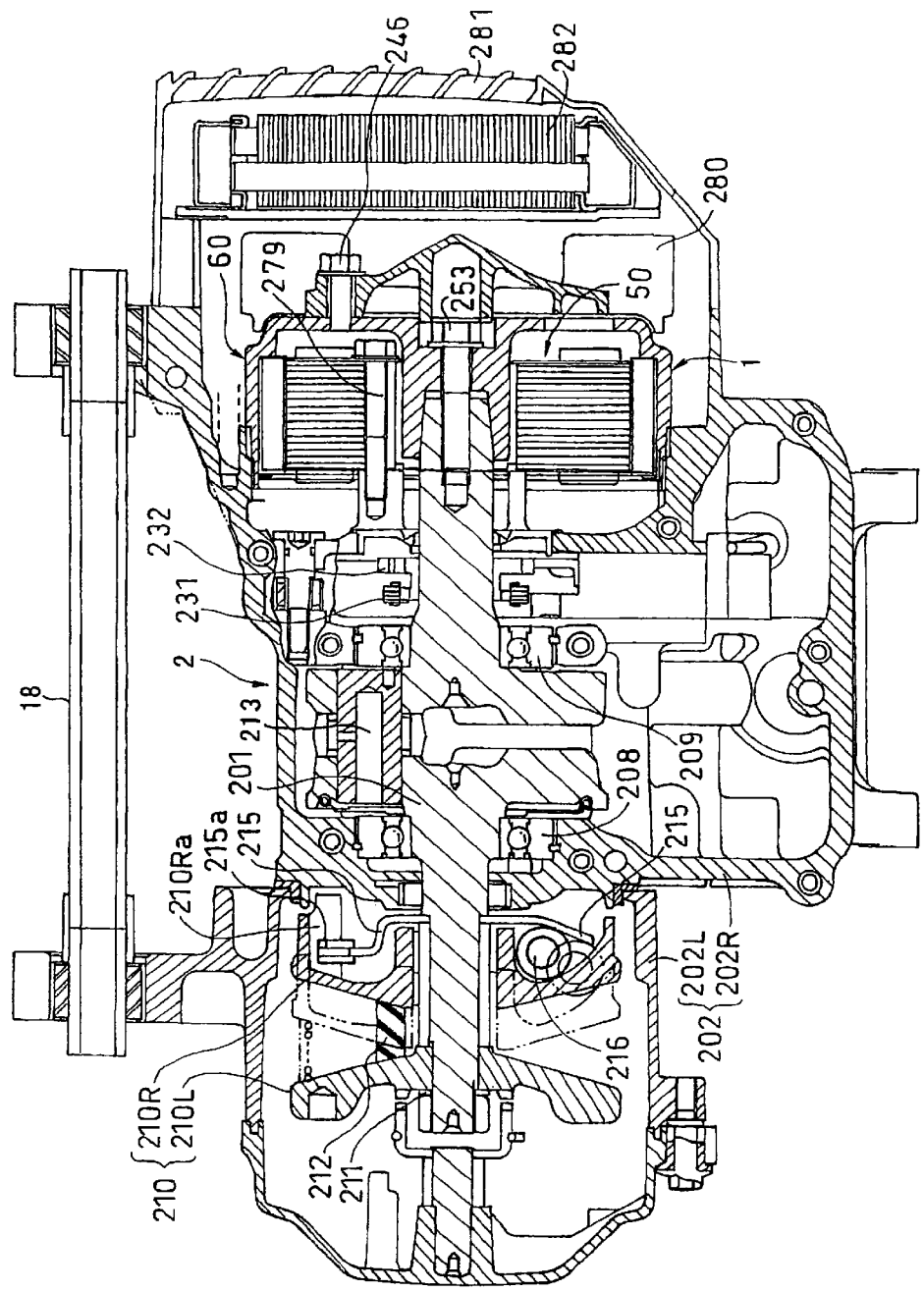
FIG. 2 is a sectional view of a swing unit of FIG. 1 taken along a crankshaft.
Figure 3:
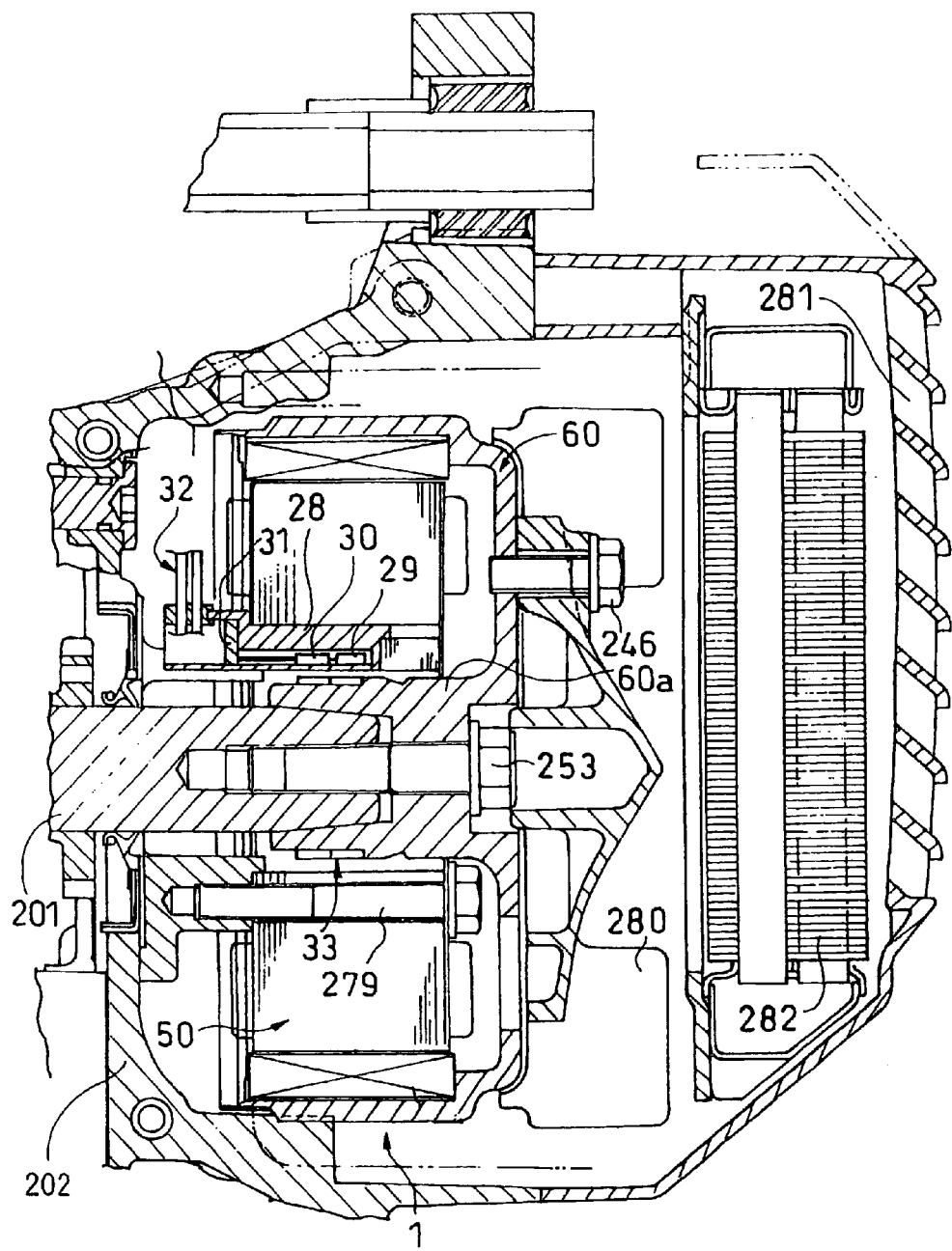
FIG. 3 is a partial enlarged view of FIG. 2.

FIG. 2 is a sectional view of the swing unit 2 taken along a crankshaft 201, and FIG. 3 is a partial enlarged view of the swing unit 2, and like reference characters to those appearing as above denote like or equivalent elements.

The swing unit 2 is covered with a crankcase 202 formed from left and right crankcase halves 202L, 202R joined together, and the crankshaft 201 is supported for rotation by bearings 208, 209 secured to the crankcase half 202R. A connecting rod (not shown) is connected to the crankshaft 201 through a crank pin 213.

The left crankcase 202L serves also as a belt type non-stage transmission case, and a belt driving pulley 210 is provided for rotation on the crankshaft 201, which extends to the left crankcase 202L. The belt driving pulley 210 is composed of a fixed side pulley half 210L and a variable side pulley half 210R. The fixed side pulley half 210L is securely mounted at a left end portion of the crankshaft 201 through a boss 211, and the variable side pulley half 210R is spline-fitted with the crankshaft 201 on the right side of the fixed side pulley half 210L such that the variable side pulley half 210R can move toward and away from the fixed side pulley half 210L. A V belt 212 is wound between the pulley halves 210L, 210R.

On the right side of the variable side pulley half 210R, a cam plate 215 is secured to the crankshaft 201, and a slide piece 215a provided at an outer circumferential end of the cam plate 215 is held in sliding engagement with a cam plate sliding boss portion 210Ra formed in an axial direction at an outer circumferential end of the variable side pulley half 210R. The cam plate 215 of the variable side pulley half 210R has a tapering face which is inclined such that a portion near to an outer circumference thereof approaches the cam plate 215 side, and a dry weight pole 216 is accommodated in a space defined between the tapering face and the variable side pulley half 210R.

As the speed of rotation of the crankshaft 201 increases, the dry weight pole 216 which is positioned between and rotate together with the variable side pulley half 210R and the cam plate 215 is moved in a centrifugal direction by centrifugal force, and the variable side pulley half 210R is pressed by the dry weight pole 216 to move leftwardly toward the fixed side pulley half 210L. As a result, the V belt 212 held between the pulley halves 210L, 210R is moved in a centrifugal direction so that the wrapping diameter thereof increases.

A driven pulley (not shown) corresponding to the belt driving pulley 210 is provided at the rear portion of the vehicle, and the V belt 212 is wrapped around the driven pulley. By this belt transmission mechanism, power of the engine E is automatically adjusted and transmitted to the centrifugal clutch and drives the rear wheel RW through the reduction gear mechanism 9 and so forth.

An ACG starter 1 that is a combination of a starter motor and an AC generator is disposed in the right crankcase half 202R. In the ACG starter 1, an outer rotor 60 is secured to the tapering end portion of the crankshaft 201 by a screw 253.

A stator 50 disposed on the inner circumference side of the outer rotor 60 is secured to the crankcase 202 by a bolt 279. A fan 280 secured by a bolt 246 is provided on the outer rotor 60. A radiator 282 is provided adjacent the fan 280 and is covered with a fan cover 281.

As shown in an enlarged scale in FIG. 3, a sensor case 28 is fitted in the inner circumference of the stator 50. Rotor angle sensors (magnetic pole sensors) 29 and a pulser sensor (ignition pulsers) 30 are provided at equal distances along an outer circumference of a boss 60a of the outer rotor 60 in the sensor case 28. The rotor angle sensors 29 are provided for energization control of stator coils of the ACG starter 1 and are provided in a one-by-one corresponding relationship for the U phase, V phase, and W phase of the ACG starter 1. The pulser sensor 30 is provided for ignition control of the engine and provided singly. The rotor angle sensors 29 and the pulser sensor 30 can each be formed from a Hall IC or a magnetic resistance (MR) element.

Leads of the rotor angle sensors 29 and the pulser sensor 30 are connected to a board 31, and further, a wire harness 32 is coupled to the board 31. A magnet ring 33 magnetized in two stages is fitted with an outer periphery of the boss 60a of the outer rotor 60 so that the magnet ring 33 may exert a magnetic action to the rotor angle sensors 29 and the pulser sensor 30.

The N poles and the S poles disposed alternately at distances of 30° in a circumferential direction corresponding to the magnetic poles of the stator 50 are formed on one of the magnetized zones of the magnet ring 33 corresponding to the rotor angle sensors 29, and a magnetized portion is formed over a range of 15° to 40° at one location in a circumferential direction on the other magnetized zone of the magnet ring 33 corresponding to the ignition pulser 30.

Upon starting of the engine, the ACG starter 1 functions as a starter motor (synchronous motor) and is driven with current supplied from a battery to rotate the crankshaft 201 to start the engine. After the engine is started, the ACG starter 1 functions as a synchronous motor charges the battery with current generated thereby and besides supplies current to various electric accessory elements.

Referring back to FIG. 2, a sprocket wheel 231 is secured to the crankshaft 201 between the ACG starter 1 and a bearing 209, and a chain for driving a camshaft (not shown) from the crankshaft 201 is wrapped around the sprocket wheel 231. It is to be noted that the sprocket wheel 231 is formed integrally with a gear wheel 232 for transmitting power to a pump for circulating lubricating oil.

Figure 4:
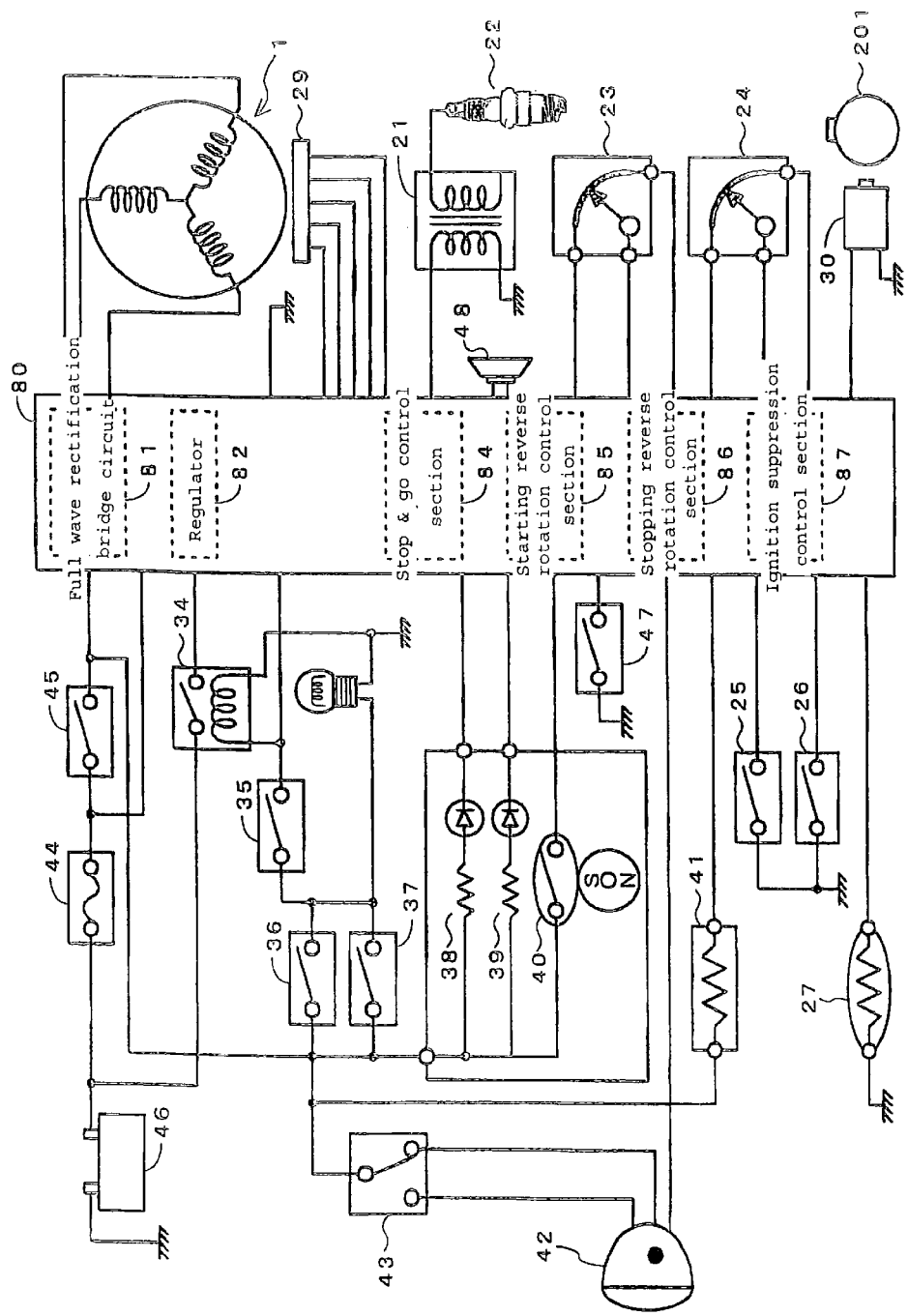
FIG. 4 is a block diagram of a control system for an ACG starter.

FIG. 4 is a block diagram of principal elements of an electric accessory system including the ACG starter 1. An ECU 80 includes a full wave rectification bridge circuit 81 for full wave rectifying three-phase ac current generated by the ACG starter 1, a regulator 82 for limiting an output of the full wave rectification bridge circuit 81 to a predetermined regulated voltage (for example, 14.5 V), and a stop & go control section 84 for automatically stopping the engine when the vehicle stops and automatically re-starting the engine when predetermined starting conditions are satisfied. The ECU 80 also includes a starting reverse rotation control section 85 for rotating, upon starting of the engine by a starter switch 35, the crankshaft 201 reversely to a predetermined position and then rotating the engine forwardly, a stopping reverse rotation control section 86 for rotating the crankshaft 201 to a predetermined position after the engine is automatically stopped by the stop & go control, and an ignition suppression control section 87 for causing the engine to misfire by a predetermined number of times at ignition timings upon starting of the engine.

An ignition coil 21 is connected to the ECU 80, and an ignition plug 22 is connected to the secondary side of the ignition coil 21. Further, a throttle sensor 23, a fuel sensor 24, a seat switch 25, an idling switch 26, a cooling water temperature sensor 27, a throttle switch 47, a warning buzzer 48, the rotor angle sensors 29, and the ignition pulser 30 are connected to the ECU 80 so that detection signals from the various element are inputted to the ECU 80.

Furthermore, a starter relay 34, the starter switch 35, stop switches 36, 37, a standby indicator 38, a fuel indicator 39, a speed sensor 40, an auto-by starter 41, and a headlamp 42 are connected to the ECU 80. A dimmer switch 43 is provided for the headlamp 42.

Current is supplied from a battery 46 to the various elements mentioned above through a main fuse 44 and a main switch 45. It is to be noted that, while the battery 46 is connected directly to the ECU 80 by the starter relay 34, it has a circuit by which it is connected to the ECU 80 only through the main fuse 44 without through the main switch 45.

As seen in FIG. 5, the stop & go control section 84 of the ECU 80 controls the components of the vehicle in one of a "starting mode", an "idling switch mode" and a "stop & go mode" in response to the state of the idling switch 26 and the state of the vehicle. In the "stop & go mode", one of a first operation pattern (hereinafter referred to as "first pattern") wherein idling is inhibited at all and a second operation pattern (hereinafter referred to as "second pattern") wherein idling is permitted exceptionally under a predetermined condition is selected.

In the "starting mode", idling is permitted only for a certain period of time after the engine is started in order to perform warming up upon starting of the engine or the like. In the "idling switch mode", idling is permitted any time in accordance with the will of the driver by switching the idling switch 26 on. In the "stop & go mode", when the vehicle is stopped from its running state, the engine is stopped automatically, and if the accelerator pedal is operated in a stopping state, then the engine is re-started automatically.

In FIG. 5, changeover conditions of the operation mode and the operation pattern are illustrated schematically, and if the idling switch 26 is OFF when the main switch 45 is switched ON (the condition [1] is satisfied), then the "starting mode" is selected.

Further, if a vehicle speed equal to or higher than a predetermined speed is detected for a predetermined period of time or more in the "starting mode" (the condition [2] is satisfied), then transition to the "stop & go mode" is performed. In the "stop & go mode", immediately after the transition thereto from the "starting mode", the "first pattern" is selected and idling is inhibited. If, in the "first pattern", an ignition OFF state continues for three minutes or more (the condition [3] is satisfied), then transition to the "second pattern" is performed. If the condition [2] described above is satisfied in the "second pattern", then transition to the "first pattern" is performed.

On the other hand, if the idling switch 26 is ON when the main switch 45 is switched ON (the condition [6] is satisfied), then the "idling switch mode" is selected. It is to be noted that, if, in the "stop & go mode", the idling switch 26 is switched ON and the condition [4] is satisfied irrespective of the "first pattern" and the "second pattern", then transition to the "idling switch mode" is performed. Further, if the idling switch 26 is switched OFF in the "idling switch mode" (the condition [5] is satisfied), then transition to the "first pattern of the stop & go mode" is performed.

FIG. 6 is a view illustrating contents of individual control of the stop & go control section 84 for each of the operation modes and operation patterns.

In the "engine starting control" (first row of FIG. 6), when predetermined conditions are satisfied for each of the operation modes and the operation patterns, an engine starting instruction is issued to drive the ACG starter 1.

More particularly, in the "starting mode" and the "idling switch mode", an engine starting instruction is issued when the starter switch 35 is ON and the stop switches 36, 37 are ON, and besides the engine speed is a predetermined idling speed or lower.

In the "first pattern of the stop & go mode", an engine starting instruction is issued when the throttle switch 47 is ON, the seat switch 25 is ON, and besides the engine speed is the predetermined idling speed or lower.

In the "second pattern of the stop & go mode", an engine starting instruction is issued when the starter switch 35 is ON, the stop switches 36, 37 are ON, and besides the engine speed is the predetermined idling speed or lower, or when the throttle switch 47 is ON, the seat switch 25 is ON, and besides the engine speed is the predetermined idling speed or lower.

In the "standby indicator control" (second row of FIG. 6), ON/OFF of the standby indicator 38 is controlled. The standby indicator blinks in a state wherein, even if the engine is in a stopping state, if the throttle is opened, then the engine can be started immediately to start the vehicle, and a warning of this is given to the driver. The standby indicator 38 is always unlit in the "starting mode", "idling switch mode", and "second pattern of the stop & go mode". In the "first pattern of the stop & go mode", the standby indicator 38 blinks when the seat switch 25 is ON and the engine speed is a predetermined speed or lower.

In the "ignition control" (third row of FIG. 6), ignition of the engine is permitted or inhibited. More particularly, in the "starting mode", "idling switch mode", and "second pattern of the stop & go mode", ignition of the engine is always permitted. In the "first pattern of the stop & go mode", ignition of the engine is permitted when the throttle switch is ON, or the vehicle speed is higher than zero, but in any other case, ignition of the engine is inhibited.

In the "headlamp control" (fourth row of FIG. 6), ON/OFF the headlamp 42 is controlled. More particularly, in the "idling switch mode", "first pattern of the stop & go mode", and "second pattern of the stop & go mode", the headlamp 42 is always controlled ON. In the "starting mode", the headlamp 42 is controlled ON when the engine speed is equal to or higher than a predetermined speed or the vehicle speed is higher than zero.

In the "warning buzzer control" (fifth row of FIG. 6), ON/OFF of the warning buzzer 48 is controlled. More particularly, in the "starting mode", the warning buzzer 48 is always controlled OFF. In the "idling switch mode", the warning buzzer 48 is switched ON if a non-seated state continues for one second or more while the ignition is OFF. In the "first pattern of the stop & go mode", warning sound is generated if a non-seated state continues for equal to or more than one second while the ignition is OFF or the ignition OFF state continues for three minutes or more. In the "second pattern of the stop & go mode", warning sound is generated when the ignition is OFF, the throttle switch is OFF, and besides the vehicle speed is zero.

In the "charging control" (sixth row of FIG. 6), upon sudden acceleration when the driver suddenly opens the throttle or upon starting of the vehicle from its stopping state, the charging voltage is lowered from 14.5 V in a normal state to 12.0 V irrespective of the operation mode or the operation pattern. More particularly, if the vehicle speed is higher than 0 km and the period of time within which the throttle is opened from its fully closed state to its fully open state is, for example, 0.3 second or less, then it is recognized that the operation is an acceleration operation, and the charging control is started. Similarly, if the throttle switch is switched ON when the vehicle speed is zero and the engine speed is a predetermined speed or lower, then this is recognized as starting of the vehicle from its stopping state, and the charging control is started. Consequently, the electric load of the ACG starter 1 is temporarily lowered to raise the acceleration performance. This control is ended by providing that six seconds elapse after the control is started, the engine speed is equal to or higher than the predetermined speed, or else the throttle opening decreases.

Referring back to FIG. 4, upon starting of the engine by the starter switch 35, the starting reverse rotation control section 85 of the ECU 80 first rotates the crankshaft 201 reversely once to a position at which the load torque upon forward rotation is low and then drives the ACG starter in the forward rotation direction to start the engine. However, only if the ACG starter 1 is rotated reversely for a fixed period of time, forward rotation cannot be started from a desired crank angle position due to a difference in rotational friction of the engine. Therefore, in the present embodiment, before the engine is rotated reversely, the temperature of cooling water is detected, and the ACG starter 1 is rotated reversely for a period of time corresponding to the water temperature. By the countermeasure, upon re-starting when the engine is stopped once, the engine can be immediately started to start the vehicle by avoiding an influence of the load torque.

Figure 7:
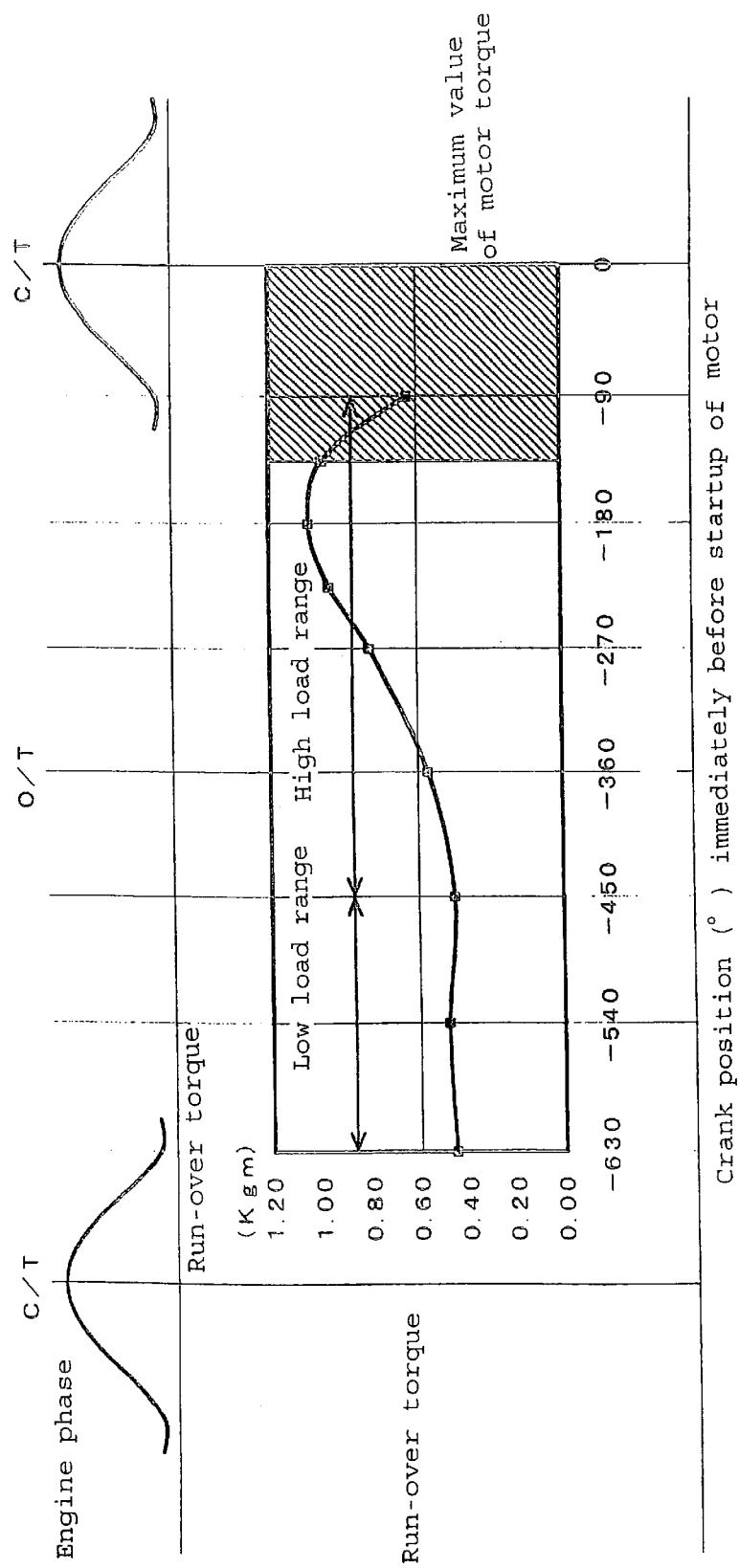
FIG. 7 is a view illustrating a relationship between the crank angle position and the run-over torque.

FIG. 7 illustrates a relationship between the crank angle position and the run-over torque, that is, torque necessary for the top dead center to be run over, upon starting of the engine. Where the crank angle position is within a range of 450 degrees to 630 degrees forwardly of the compression top dead center C/T, that is, within a range of 90 degrees to 270 degrees (low load range) forwardly of the exhaust top dead center O/T, the run-over torque is low. Meanwhile, where the crank angle position is within another range of 90 degrees to 450 degrees (high load range) forwardly of the compression top dead center C/T, the run-over torque is high, and particularly at 180 degrees forwardly of the compression top dead center C/T, the run-over torque is highest. In other words, the run-over torque is generally high before the compression top dead center C/T, but is generally low before the exhaust top dead center O/T.

Therefore, in the present embodiment, the energization time period, when the ACG starter 1 is energized in the reverse direction of the crankshaft 201 is determined so that the crankshaft 201 is stopped within the low load range described above. Where the crankshaft 201 is rotated reversely to the low load range and the ACG starter 1 is energized in the forward rotation direction from this position, then the compression top dead center C/T can be run over with low run-over torque.

Incidentally, when the engine is stopped, the crank does not stop in the proximity of the compression top dead center C/T (on the reverse rotation direction side, the range from the compression top dead center C/T to 140 degrees forwardly of the compression top dead center C/T) in most cases (range indicated by hatching). Therefore, the ACG starter 1 is energized in the reverse rotation direction for a period of time required to vary the crank angle position from 140 degrees forwardly of the compression top dead center C/T to a leading end of the low load range, that is, to 90 degrees forwardly of the exhaust top dead center O/T.

Particularly, if the ACG starter 1 is rotated reversely for a time period required or more for the crankshaft 201 to rotate between the compression top dead center C/T and the exhaust top dead center O/T, that is, for a time period or more which the crank angle position varies by 360 degrees, then at whichever position the crankshaft 201 is positioned upon starting of the reverse rotation, the crank angle position after the crankshaft 201 is rotated reversely by 360 degrees or more is forwardly of the exhaust top dead center O/T, that is, is included in the low load range.

Figure 8:
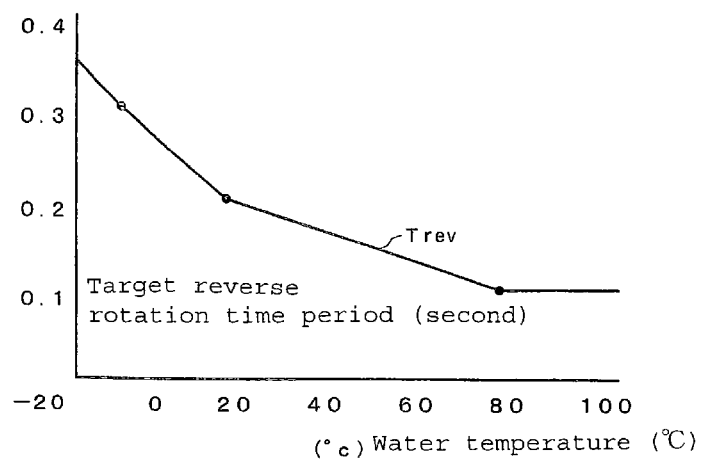
FIG. 8 is a view illustrating a relationship between the target reverse rotation time period and the water temperature.

FIG. 8 is a diagram illustrating a relationship between the target reverse rotation time period "Trev" of the ACG starter 1 and the cooling water temperature of the engine. In the present embodiment, the target reverse rotation time period Trev is set so as to decrease as the temperature of cooling water of the engine rises, that is, as the rotational friction decreases.

Now, operation of the present embodiment is described in detail with reference to a timing chart of FIG. 9 and flow charts of FIGS. 10 to 13.

Figure 9:
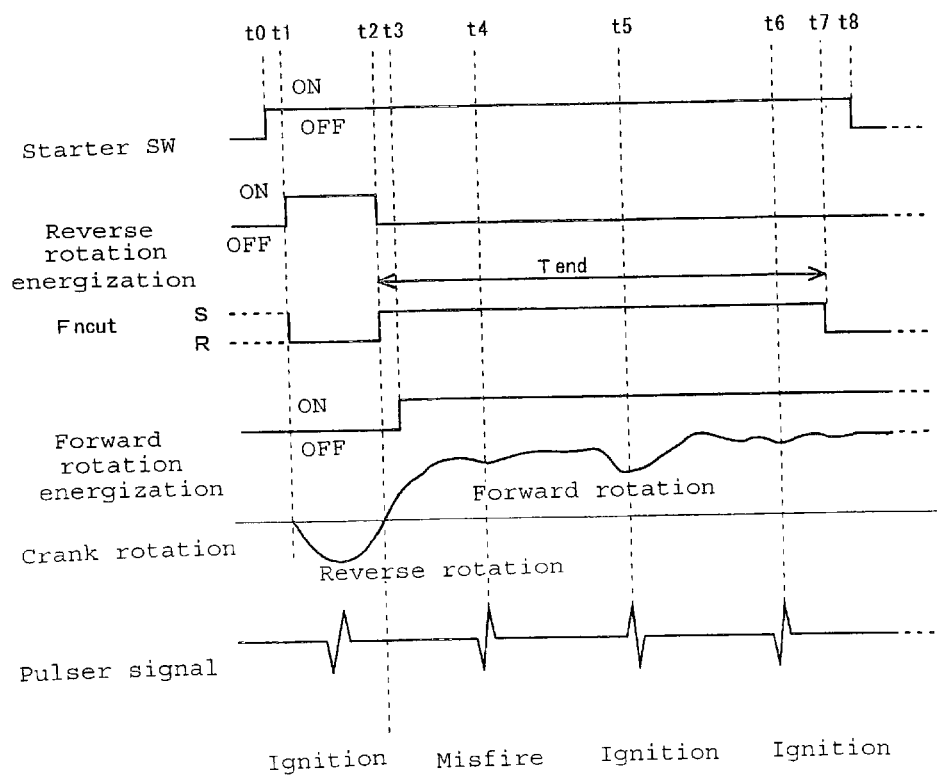
FIG. 9 is a timing chart of engine starting control.

If the starter switch 35 is switched on at time "t0" of FIG. 9, then the stop & go control section 84 is started up in the "starting mode" or the "idling switch mode". If the engine starting instruction described hereinabove is issued at time "t1" and this is detected at step S10, then "starting reverse rotation control" is executed at step S11 to reversely rotate the crankshaft 201 to a predetermined position.

Figure 11:
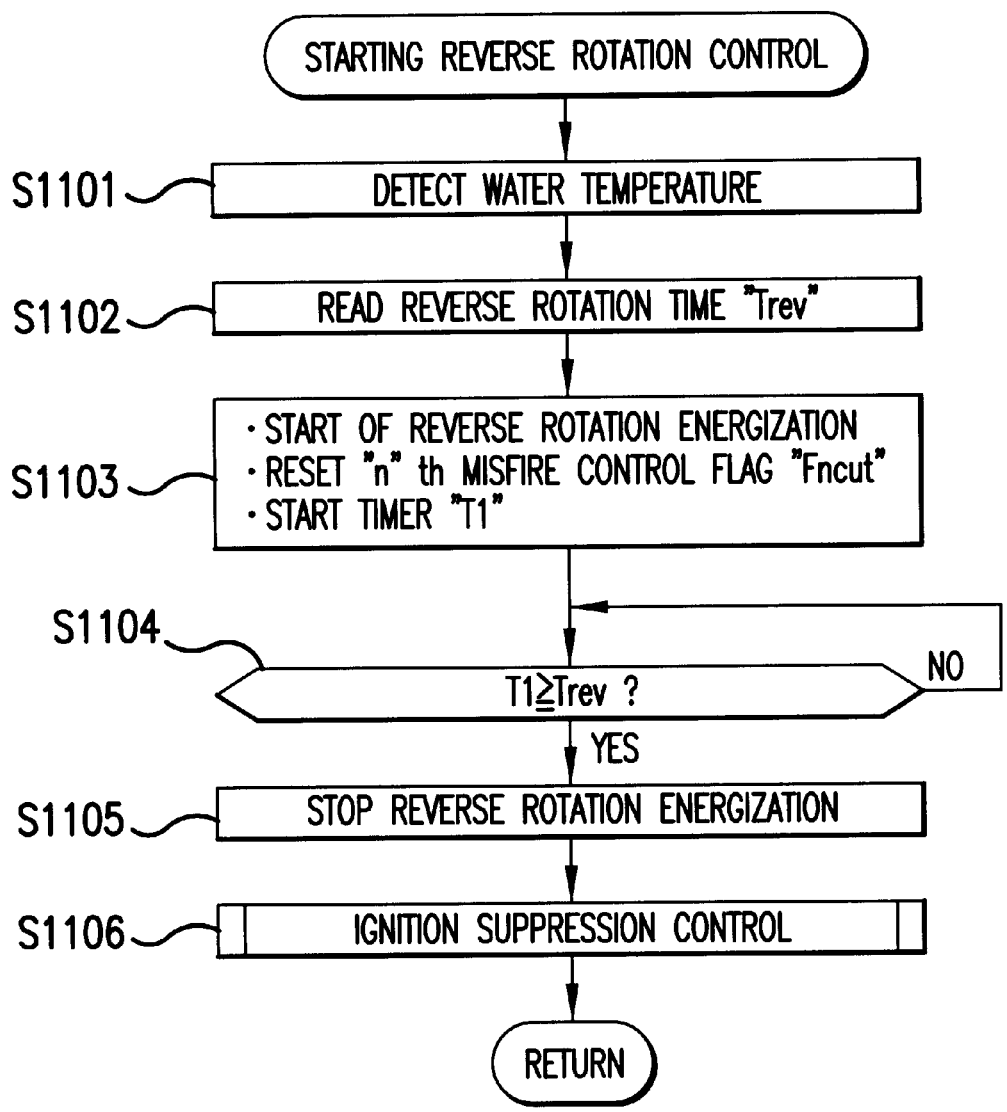
FIG. 11 is a flow chart of starting reverse rotation control.

FIG. 11 is a flow chart illustrating operation of the "starting reverse rotation control", and this is executed by the starting reverse rotation control section 85 of the ECU 80.

At step S1101, the temperature of cooling water of the engine is detected based on an output of the cooling water sensor 27. At step S1102, a target reverse rotation time period Trev corresponding to the detected water temperature is read out from a data table. In the present embodiment, the target reverse rotation time period Trev is given as a function of the cooling water temperature as described hereinabove with reference to FIG. 8.

At step S1103, reverse rotation energization is started to start reverse rotation of the crankshaft 201, and simultaneously, an "n" th misfire control flag "Fncut" representing whether or not the ignition suppression control by the ignition suppression control section 87 described hereinabove is proceeding is reset (the control is not proceeding) and a reverse rotation time period timer "T1" for counting the period of time of reverse rotation is started.

At step S1104, the reverse rotation time period timer T1 and the target reverse rotation time period Trev are compared with each other, and the reverse rotation energization is continued until the reverse rotation time period timer T1 reaches the target reverse rotation time period Trev. Thereafter, when the reverse rotation time period timer T1 reaches the target reverse rotation time period Trev at time "t2" of FIG. 9, the reverse rotation energization is stopped at step S1105. At step S1106, the ignition suppression control by the ignition control suppression section 87 is started.

Figure 12:
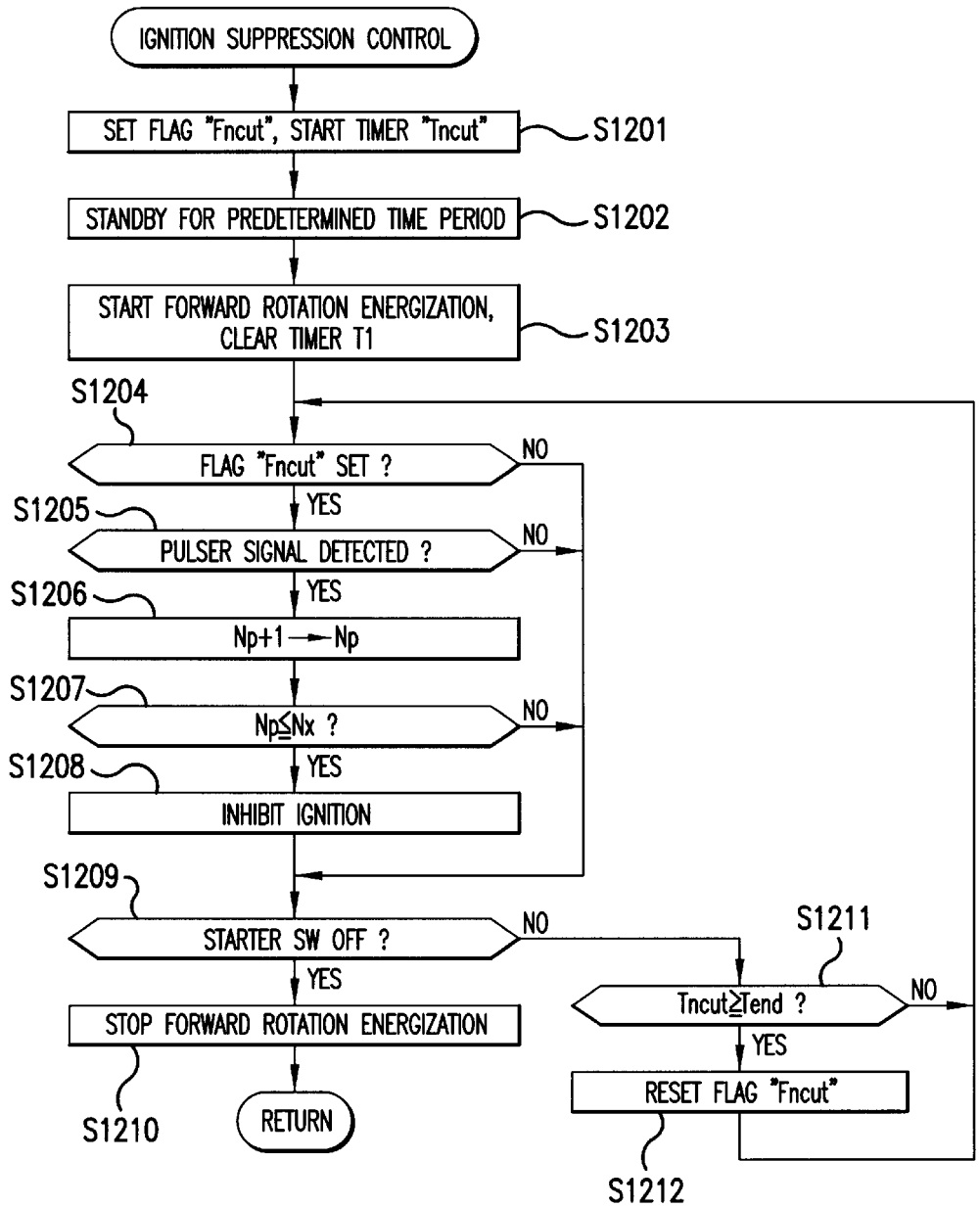
FIG. 12 is a flow chart of ignition suppression control.

FIG. 12 is a flow chart illustrating the "ignition suppression control". At step S1201, the "n" th misfire control flag Fncut representing whether or not the ignition suppression control is proceeding is set (the control is proceeding), and an ignition suppression cancellation timer "Tncut" for limiting the ignition suppression control only to a predetermined period of time is started. Then, after waiting for the predetermined period of time at step S1202, the processing advances to step S1203, at which forward rotation energization is started at time "t3" of FIG. 9 and the reverse rotation time period timer T1 is cleared.

At step S1204, reference is made to the "n" th misfire control flag Fncut. Since the "n" th misfire control flag Fncut initially is in a set state (under the ignition suppression control), the processing advances to step S1205. When an ignition timing is reached at time "t4" of FIG. 9 and a pulser signal is detected at step S1205, the ignition timing counter Np is incremented at step S1206. Accordingly, the ignition timing counter Np represents the number of times by which an ignition timing comes upon starting of the engine. At step S1207, the value of the ignition timing counter Np is compared with the value Nx of the ignition inhibition counter.

A number of times by which ignition should be inhibited upon starting of the engine is registered in advance in the ignition inhibition counter Nx. In the present embodiment, "1" is registered in the ignition inhibition counter Nx. Accordingly, the discrimination at step S1207 now is in the affirmative, and the processing advances to step S1208. At step S1208, ignition in the current cycle is inhibited and the engine misfires.

At step S1209, it is discriminated whether or not the starter switch 35 is switched OFF. Since the starter switch 35 initially remains in an ON state, the processing advances to step S1211. At step S1211, the ignition suppression cancellation timer Tncut is compared with the ignition suppression cancellation time "Tend". Since Tncut<Tend at the present point of time, in order to continue the ignition suppression control, the processing returns to step S1204 so that the processes described above are repeated.

Thereafter, second and third ignition timings come at times "t5" and "t6". If this is detected at step S1205, the ignition timing counter Np is incremented at step S1206 every time, and at step S1207, the value of the ignition timing counter Np is compared with the value Nx of the ignition inhibition counter. In the present embodiment, since the value Nx of the ignition inhibition counter is "1" and it is discriminated that Np>Nx, the processing advances to step S1209 et seq. by skipping the step S1208. Accordingly, the engine is ignited normally at the ignition timings of times "t5" and "t6".

Thereafter, when the ignition suppression cancellation timer Tncut reaches the ignition suppression cancellation time Tend at time "t7" of FIG. 9 and this is detected at step S1211, the "n" th misfire control flag Fncut is reset at step S1212. Accordingly, since thereafter the steps S1205 to S1208 are skipped, ignition at any ignition timing is not inhibited at all irrespective of the value of the ignition inhibition counter Nx.

Thereafter, the starter switch 35 is switched OFF at time "t8", and when this is detected at step S1209, the energization for forward rotation is stopped at step S1210.

In this manner, with the present embodiment, even if air fuel mixture remaining in the exhaust pipe is sucked into the cylinder in an exhaust stroke upon reverse rotation and is compressed at the exhaust top dead center upon forward rotation after then, since ignition is inhibited at the timing, the air fuel mixture is not fired.

Referring back to FIG. 10, when the engine automatically stops in the stop & go mode after the engine is started and this is detected at step S12, a "stopping reverse rotation control" for rotating the crankshaft 201 reversely to a predetermined position in advance is executed at step S13.

Figure 14:
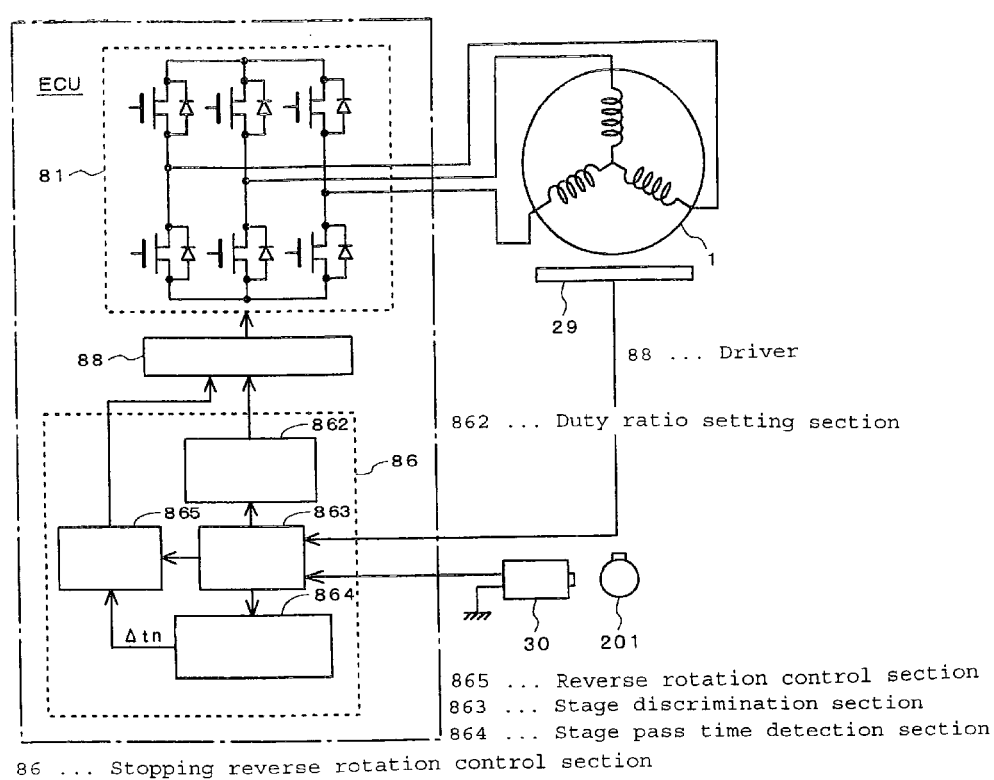
FIG. 14 is a functional block diagram of a stopping reverse rotation control section.

FIG. 14 is a functional block diagram of the "stopping reverse rotation control". In the stopping reverse rotation control section 86, a stage discrimination section 863 divides the rotational position of the crankshaft 201 to 36 stages of stages #0 to #35 based on output signals of the rotor angle sensors 29 and discriminates a present stage sing a detection timing of a pulse signal generated by the ignition pulser 30 as a reference stage (stage #0).

A stage pass time detection section 864 detects a pass time .tn of the current stage based on a period of time after the stage discrimination section 863 discriminates a new stage until it discriminates a next stage. A reverse rotation control section 865 generates a reverse driving instruction based on the discrimination result by the stage discrimination section 863 and the pass time .tn detected by the stage pass time detection section 864.

A duty ratio setting section 862 dynamically controls the duty ratio of the gate voltage to be supplied to each power FET of the full wave rectification bridge circuit 81 based on the discrimination result by the stage discrimination section 863. A driver 88 supplies a driving pulse of the thus set duty ratio to each power FET of the full wave rectification bridge circuit 81.

Figure 13:
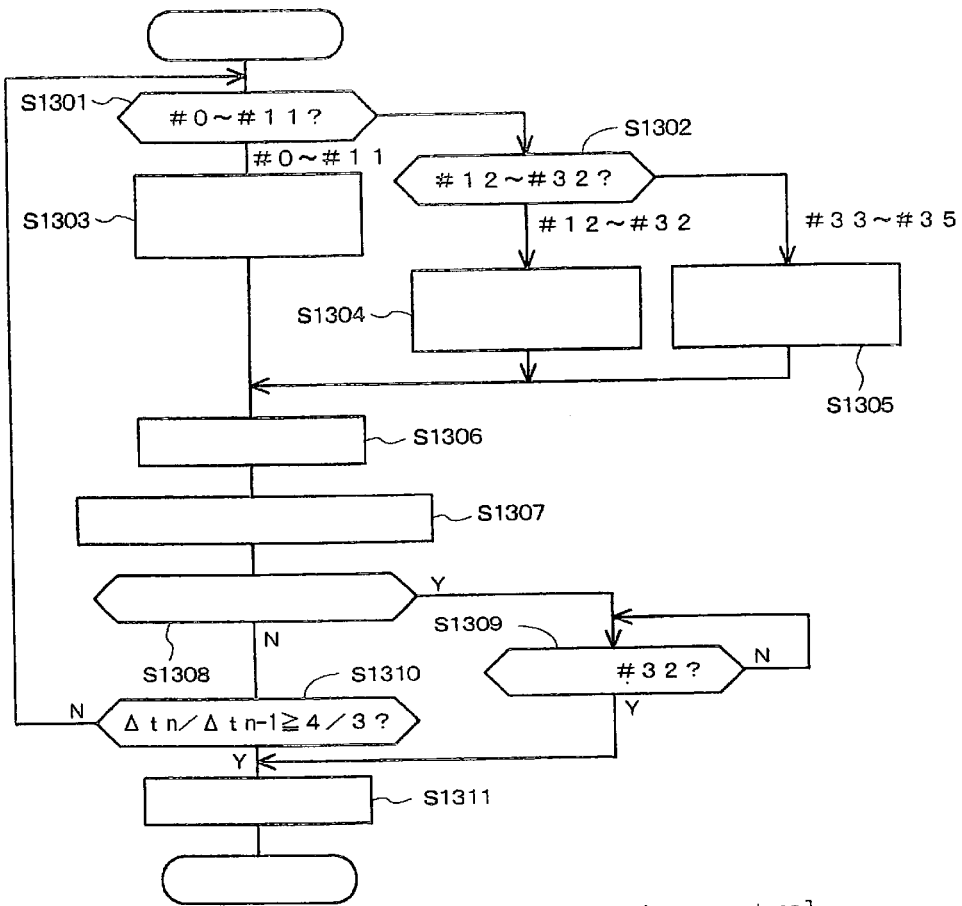
FIG. 13 is a flow chart of stopping reverse rotation control.

Subsequently, operation of the stopping reverse rotation control section 86 described above is described with reference to a flow chart of FIG. 13 and the diagrammatic views of the operation shown in FIGS. 15(*a*)–(*c*).

Figure 15:
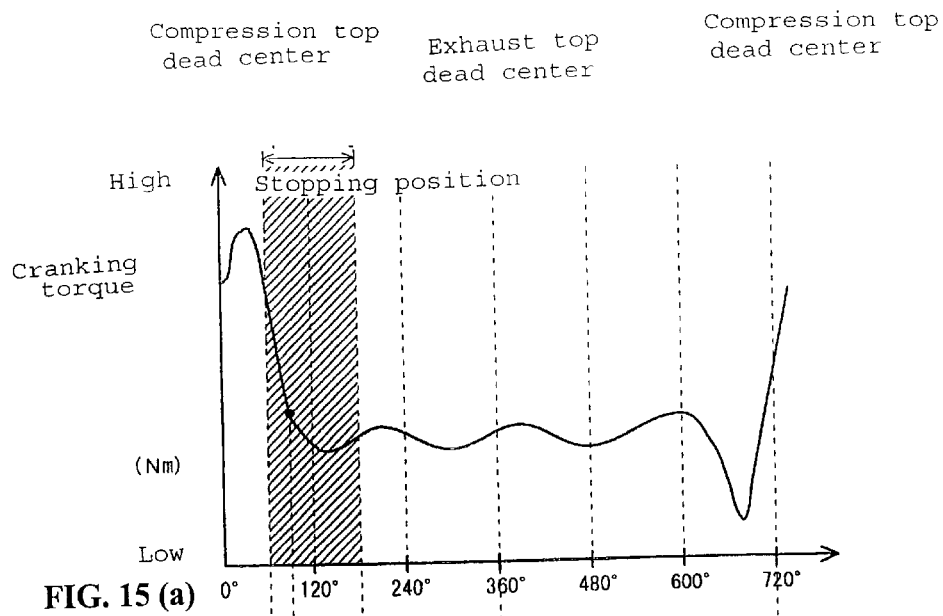
FIGS. 15(a)–(c) are diagrams illustrating operation of the stopping reverse rotation control.
Figure 15:
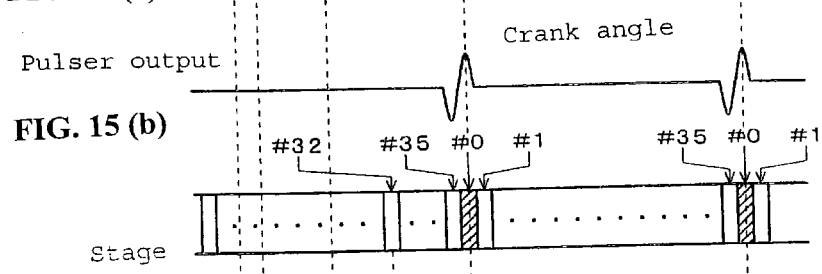
Figure 15:
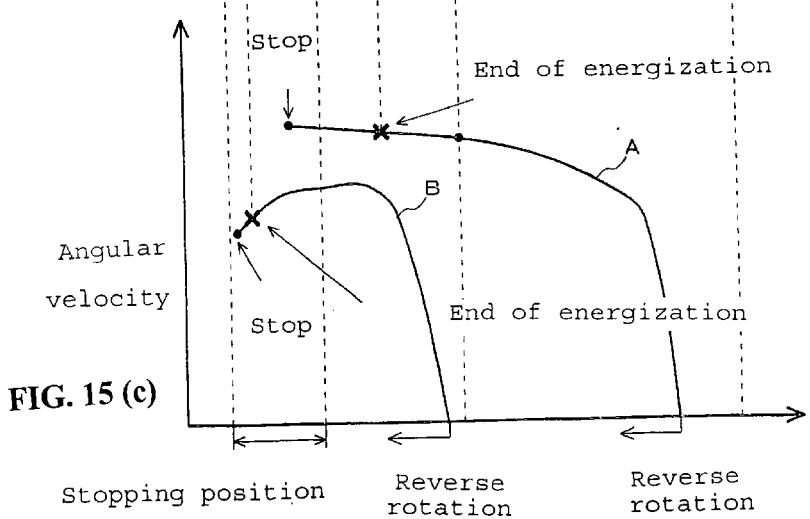

FIG. 15(*a*) indicates a relationship between the cranking torque (reverse rotation load) required to rotate the crankshaft 201 reversely and the crank angle, and the cranking torque increases suddenly immediately before the compression top dead center is reached (upon reverse rotation). FIG. 15(*b*) indicates a relationship between the crank angle and the stage, and FIG. 15(*c*) shows a variation of the angular velocity of the crankshaft upon reverse rotation.

When stopping of the engine is detected, the present stage discriminated already by the stage discrimination section 863 is referred to at steps S1301 and 1302. Here, if the current stage is one of the stages #0 to #11, then the processing advances to step S1303, but if the current stage is one of the stages #12 to #32, then the processing advances to step S1304, and in any other case (one of the stages #33 to #35), the processing advances to step S1305. At steps S1303 and S1305, the duty ratio of the driving pulse is set to 70% by the duty ratio setting section 862, but at step S1304, the duty ratio of the driving pulse is set to 80% by the duty ratio setting section 862.

As described above, dynamic control of the duty ratio is performed in order to sufficiently lower the angular velocity of the crankshaft 201 upon reverse rotation before an angle corresponding to the compression top dead center at which the cranking torque is high is reached (upon reverse rotation), but also to permit rapid reverse rotation driving at any other angle. This will be described later.

At step S1306, the driver 88 controls each power FET of the full wave rectification bridge circuit 81 with the set duty ratio described above to start reverse rotation energization. At step S1307, the pass time .tn of the passed stage #n is measured by the stage pass time detection section 864.

At step S1308, the reverse rotation control section 865 discriminates whether or not the crankshaft 201 passes the stage #0, that is, the position in the proximity of the top dead center. If the stage #0 is not passed, then the ratio [.tn/.tn−1] between the pass time .tn of the stage #n passed last and the pass time .tn−1 of the stage #(n−1) passed before the last is compared with a reference value "Rref" (in the present embodiment, 4/3). If the pass time ratio [.tn/.tn−1] is not higher than the reference value Rref, then the processing returns to step S1301 to continue the reverse rotation driving, and the processes described above are repeated in parallel to the continued reverse rotation driving.

Here, if the engine stopping position, that is, the reverse rotation starting position, is on the side nearer to the compression top dead center in a next cycle than a middle position between the compression top dead centers in the preceding and next cycles as shown by the curve A in FIG. 15(*c*), or in other words, is in the course of rotation after the exhaust top dead center is passed (upon forward rotation) until the compression top dead center is reached, the crankshaft can pass the stage #0 (exhaust top dead center) although the ACG starter 1 is driven to rotate reversely with the duty ratio of 70%. Accordingly, this is detected at step S1308, and the processing advances to step S1309, at which it is discriminated whether or not the crankshaft 201 reaches the stage #32. If it is discriminated that the crankshaft 201 reaches the stage #32, then the reverse rotation energization is stopped at step S1311, and therefore, the crankshaft stops after it is further rotated reversely by inertial force.

On the other hand, if the reverse rotation starting position is on the side nearer to the compression top dead center in a preceding cycle than a middle position between the compression top dead centers in the preceding and next cycles as shown by the curve B in FIG. 15(*c*), or in other words, is in the course of rotation after the compression top dead center is passed (upon forward rotation) until the exhaust top dead center is reached, since the ACG starter 1 is driven to rotate reversely with the duty ratio of 70%, when the reverse rotation load increases forwardly of the stage #0 (upon reverse rotation), the angular velocity of the crankshaft 201 drops suddenly as seen in FIG. 15(*a*). Then, when it is discriminated at step S1310 that the pass time ratio [.tn/.tn−1] is higher than 4/3 of the reference value, the reverse rotation energization is stopped at step S1311, and the reverse rotation of the crankshaft stops substantially simultaneously with the stopping of energization.

In this manner, upon reverse rotation driving after the engine stops, the apparatus of the present invention supervises whether or not the crankshaft passes an angle corresponding to the top dead center, and whether or not the angular velocity of the crankshaft drops. When the crankshaft passes the top dead center upon reverse rotation, reverse rotation energization is ended immediately thereafter and reverse rotation energization is ended also when the angular velocity of the crankshaft drops as a result of increase of the reverse rotation load, the crankshaft can be returned to a position forwardly of the last compression top dead center (upon reverse rotation) at which the compression reactive force is low irrespective of the reverse rotation starting position.

Further, in the present embodiment, since the angular velocity of the crankshaft 201 is detected based on the outputs of the rotor angle sensors 29 which detect the rotor angle (that is, the stage) of the ACG starter 1, there is no need to provide a separate sensor for detecting the angle of the crankshaft 201.

Referring back to FIG. 10, at step S14, it is discriminated whether or not the engine starting conditions are satisfied. If the engine starting conditions are satisfied, then forward rotation energization is started to crank the engine in the forward rotation direction at step S15. At step S16, it is discriminated, for example, based on the engine speed whether or not the starting of the engine is completed. If it is discriminated that the starting of the engine is completed, then the forward rotation energization is stopped at step S17.

It is to be noted that, in the embodiment described above, while the ignition suppression control is carried out only upon starting of the engine by an operation of the starter switch in the "starting mode" and the "idling switch mode", it can be carried out similarly also upon starting of the vehicle after the engine stops in the "stop & go mode".

Further, in the embodiment described above, while it is described that "1" is registered into the ignition inhibition counter Nx and ignition of the engine is inhibited only once for the first time after forward rotation, if the value of 2, 3, ... is registered into the ignition inhibition counter Nx, then ignition of the engine can be inhibited by a plural number of times after the engine is rotated forwardly.

Further, in the embodiment described above, while a vehicle that includes only an ACG starter as engine starting means is described as an example, the present invention can be applied similarly also to a vehicle that additionally includes starting means by a kick pedal. However, in order that the ignition suppression control for causing the engine to misfire by a predetermined number of times upon starting of the engine may function only upon starting by the ACG starter but may not function upon kick starting wherein the crankshaft is not rotated reversely in advance, it is preferable to include means for selectively canceling the suppression function upon kick starting.

According to the present invention, in an engine starting control apparatus that includes reverse rotation control means for causing, upon starting of an engine, a crankshaft of the engine to rotate reversely to a predetermined position, an ignition suppression means is provided for inhibiting ignition of the engine for a predetermined period of time after forward rotation of the engine. As a result, the following positive effect is produced: even if the air fuel mixture remaining in the exhaust pipe is sucked into the cylinder in an exhaust stroke during the reverse rotation and is compressed at the exhaust top dead center during the forward rotation thereafter, since ignition is inhibited at this time, the air fuel mixture is not fired at all.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine starting control apparatus having reverse rotation control means that causes, upon starting of an engine, a crankshaft of said engine to rotate reversely to a predetermined position and then rotate said crankshaft forwardly, comprising:
   a starter motor connected to said crankshaft;
   ignition means for igniting said engine in the proximity of the top dead center of a piston; and
   ignition suppression means for inhibiting the ignition of said engine for a predetermined period of time after the forward rotation of said engine.

2. The engine starting control apparatus according to claim 1, wherein said reverse rotation control means causes said crankshaft to rotate reversely until said piston runs over an exhaust top dead center.

3. The engine starting control apparatus according to claim 1, wherein said engine has a valve overlap period within which an intake valve and an exhaust valve communicate with each other in the proximity of an exhaust top dead center, and said ignition means inhibits ignition and causes the engine to misfire at a position in the proximity of the exhaust top dead center.

4. The engine starting control apparatus according to claim 1, wherein said ignition suppression means inhibits ignition of said engine only for a first ignition timing after said engine is rotated forwardly.

5. The engine starting control apparatus according to claim 1, further comprising kick starting means for causing said crankshaft to rotate forwardly using man-power, and ignition suppression cancellation means for canceling the inhibition of the ignition of said engine by said ignition suppression means when said engine is started by said man-power.

6. The engine starting control apparatus according to claim 1, before the engine is rotated reversely, a temperature of a cooling water is detected, and said starting motor is rotated reversely for a period of time corresponding to the water temperature.

7. The engine starting control apparatus according to claim 2, further comprising a control unit which, during reverse rotation on the crankshaft after the engine stops, supervises whether or not the crankshaft passes an angle corresponding to said top dead center, and whether or not an angular velocity of the crankshaft drops.

8. The engine starting control apparatus according to claim 7, the angular velocity of the crankshaft is detected based an output of a rotor angle sensor which detects a rotor angle of the starter motor.

9. An engine starting control apparatus comprising:
   a starter motor connected to a crankshaft of said engine;
   reverse rotation control means capable of causing said crankshaft to rotate reversely to a predetermined position, to stop rotation of said crankshaft at said predetermined position, and then to rotate said crankshaft forwardly upon starting of said engine;
   ignition means for igniting said engine in the proximity of the top dead center of a piston; and
   ignition suppression means for inhibiting the ignition of said engine for a predetermined period of time after the forward rotation of said engine.

10. The engine starting control apparatus according to claim 9, wherein said reverse rotation control means causes said crankshaft to rotate reversely until said piston runs over an exhaust top dead center.

11. The engine starting control apparatus according to claim 9, wherein said engine has a valve overlap period within which an intake valve and an exhaust valve communicate with each other in the proximity of an exhaust top dead center, and said ignition means inhibits ignition and causes the engine to misfire at a position in the proximity of the exhaust top dead center.

12. The engine starting control apparatus according to claim 9, wherein said ignition suppression means inhibits ignition of said engine only for a first ignition timing after said engine is rotated forwardly.

13. The engine starting control apparatus according to claim 9, further comprising kick starting means for causing said crankshaft to rotate forwardly using man-power, and ignition suppression cancellation means for canceling the inhibition of the ignition of said engine by said ignition suppression means when said engine is started by said man-power.

14. The engine starting control apparatus according to claim 9, before the engine is rotated reversely, a temperature of a cooling water is detected, and said starting motor is rotated reversely for a period of time corresponding to the water temperature.

15. The engine starting control apparatus according to claim 10, further comprising a control unit which, during reverse rotation on the crankshaft after the engine stops, supervises whether or not the crankshaft passes an angle corresponding to said top dead center, and whether or not an angular velocity of the crankshaft drops.

16. The engine starting control apparatus according to claim 15, the angular velocity of the crankshaft is detected based on an output of a rotor angle sensors which detects a rotor angle of the starter motor.

* * * * *